United States Patent
Reese et al.

(10) Patent No.: US 8,576,084 B2
(45) Date of Patent: Nov. 5, 2013

(54) ACCURACY IMPROVEMENT IN FLOWMETER SYSTEMS

(75) Inventors: Michael Reese, Kaufman, TX (US); Peter E. Allstrom, Warwick, RI (US)

(73) Assignee: Invensys Systems, Inc., Foxboro, MA (US)

(*) Notice: Subject to any disclaimer, the term of this patent is extended or adjusted under 35 U.S.C. 154(b) by 429 days.

(21) Appl. No.: 12/909,427

(22) Filed: Oct. 21, 2010

(65) Prior Publication Data

US 2012/0019389 A1 Jan. 26, 2012

Related U.S. Application Data

(60) Provisional application No. 61/367,517, filed on Jul. 26, 2010.

(51) Int. Cl.
  *G08B 21/00* (2006.01)
  *G01L 13/00* (2006.01)

(52) U.S. Cl.
  USPC ............. 340/606; 340/609; 340/610; 702/45; 702/130

(58) Field of Classification Search
  USPC ......... 340/606, 607, 609, 610, 611, 618, 619, 340/620, 621, 605; 73/200, 861.02, 861.08, 73/861.24; 702/45, 47, 130; 703/2
  See application file for complete search history.

(56) References Cited

U.S. PATENT DOCUMENTS

| | | | |
|---|---|---|---|
| 4,683,532 A | 7/1987 | Yount et al. | |
| 5,453,944 A * | 9/1995 | Baumoel | ............................ 703/2 |
| 6,041,017 A * | 3/2000 | Goldsberry | ........................ 367/38 |
| 6,237,618 B1 | 5/2001 | Kushner | |
| 6,412,353 B1 | 7/2002 | Kleven et al. | |
| 6,453,753 B1 * | 9/2002 | Koudal et al. | .............. 73/861.02 |
| 7,295,934 B2 * | 11/2007 | Hairston | ......................... 702/45 |
| 7,380,523 B2 * | 6/2008 | Donnelly | ................... 122/14.31 |
| 7,389,687 B2 * | 6/2008 | Gysling et al. | .................. 73/200 |
| 2002/0011120 A1 | 1/2002 | Huang | |
| 2004/0049358 A1 | 3/2004 | Cook et al. | |
| 2008/0190195 A1 | 8/2008 | Duffill et al. | |
| 2009/0187356 A1 | 7/2009 | Artiuch | |

OTHER PUBLICATIONS

Authorized Officer Lee W. Young, International Search Report and the Written Opinion of the International Searching Authority for Application No. PCT/US2011/038552 dated Sep. 16, 2011, 14 pages.
EC-VAV-L EC-WT-L Users Guide V1.2, Distech Controls Inc., Aug. 2003 [retrieved on Aug. 26, 2011], 115 pages. Retrieved from the Internet: <URL: http://www.hvac.net/pdf/distech/ec-vavl/05DI-UGVAVU-12.pdf>.

* cited by examiner

*Primary Examiner* — Van T. Trieu
(74) *Attorney, Agent, or Firm* — Edward S. Jarmolowicz, Esq.

(57) ABSTRACT

A flowmeter method and system. In an implementation, a signal is received from a flowmeter and a value is determined based on the signal. The value is compared to a threshold. A heartbeat value is provided when the value is greater than a threshold value. In some implementations, a flow rate of a fluid is based on the heartbeat value. In some implementations, the heartbeat value is monitored and an alarm is selectively generated based on the monitoring.

36 Claims, 4 Drawing Sheets

ACCURACY IMPROVEMENT IN FLOWMETER SYSTEMS

CROSS-REFERENCE TO RELATED APPLICATIONS

This application claims priority to U.S. Provisional Patent Application Ser. No. 61/367,517, filed on Jul. 26, 2010, the disclosure of which is expressly incorporated herein in its entirety.

TECHNICAL FIELD

The present disclosure relates to measuring a flow rate of a fluid flow, and more particularly, to improving an accuracy of a flowmeter system in measuring the flow rate of the fluid flow and a volume of the fluid flow during a time period.

BACKGROUND

Flowmeters may measure the rate of a fluid flow in a pipe or other pathway. The fluid flow may be, for example, a gas or a liquid, and may be compressible or incompressible. The fluid flow can include, for example, liquid, gas, or a combination of liquid and gas.

Flowmeters can be implemented in systems to monitor a volume of fluid flowing through a conduit. For example, a fluid separator can separate a fluid mixture into a first fluid and a second fluid. Fluid separators can include, for example, an oil (e.g., a first fluid) and gas (e.g., a second fluid) separator, or a water (e.g., a first fluid) and gas (e.g., a second fluid) separator. In such implementations, a flowmeter can be used to monitor a volume of one or more of the separated fluids flowing from the separator. In the example case of a liquid and gas separator, one or more flowmeters can be implemented to monitor the volume of liquid exiting the separator and/or the volume of gas exiting the separator. However, a presence of gas in the existing liquid flow may complicate measuring the volume of liquid.

SUMMARY

Implementations of the present disclosure are directed to methods including receiving a signal from a flowmeter, the flowmeter being responsive to a fluid flow through the conduit, determining a value based on the signal, comparing the value to a threshold, providing a heartbeat value when the value is greater than the threshold, and determining a flow rate of the fluid flow based on the heartbeat value.

In some implementations, the flowmeter includes a vortex flowmeter.

In some implementations, the method further includes determining a volume of fluid flowing through the conduit based on the flow rate.

In some implementations, the threshold is indicative of a boundary between a liquid region and a gas region of the fluid flow.

In some implementations, the fluid flow is a composite fluid flow including a first fluid and a second fluid. The first fluid can include a liquid and the second fluid can include a gas.

In some implementations, the threshold is determined as a percentage of an upper range value corresponding to an expected type of fluid flow. The expected type of fluid flow can be liquid.

In some implementations, the method further includes receiving user input, and determining the threshold based on the user input.

In some implementations, the method further includes totalizing a volume of the flow over a period of time to determine a total volume of fluid. Totalizing can include minimizing the volume of the flow within the total volume flow when the flow rate is based on the heartbeat value.

Implementations of the present disclosure are also directed to methods including receiving a signal from a flowmeter, the flowmeter being responsive to a fluid flow, determining a value based on the signal, comparing the value to a threshold, providing a heartbeat value when the value is greater than the threshold, monitoring the heartbeat value, and selectively generating an alarm based on the monitoring.

In some implementations, monitoring the heartbeat value includes determining an amount of time the value is greater than the threshold, and comparing the amount of time to a time threshold, wherein the alarm is generated when the amount of time exceeds the time threshold.

In some implementations, monitoring the heartbeat value includes determining that the value is less than the threshold, and incrementing an amount of time when the value is less than the threshold. Monitoring the heartbeat value can further include determining that the amount of time is greater than a time threshold, and generating the alarm in response to determining that the amount of time is greater than a time threshold.

In some implementations, the flowmeter comprises a vortex flowmeter.

In some implementations, the threshold is indicative of a boundary between a liquid region and a gas region of the fluid flow.

In some implementations, the fluid flow is a composite fluid flow comprising a first fluid and a second fluid. The first fluid can be a liquid and the second fluid can be a gas.

In some implementations, the threshold is determined as a percentage of an upper range value corresponding to an expected type of fluid flow. The expected type of fluid flow can be liquid.

In some implementations, the method further includes receiving user input, and determining the threshold based on the user input.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. In some implementations, the system includes a flowmeter, one or more processors in communication with the flowmeter, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is to say that methods in accordance with the present disclosure are not limited to the combinations of aspects and features specifically described herein, but also include any combination of the aspects and features provided.

The details of one or more implementations of the present disclosure are set forth in the accompanying drawings and the

DETAILED DESCRIPTION

Figure 1:
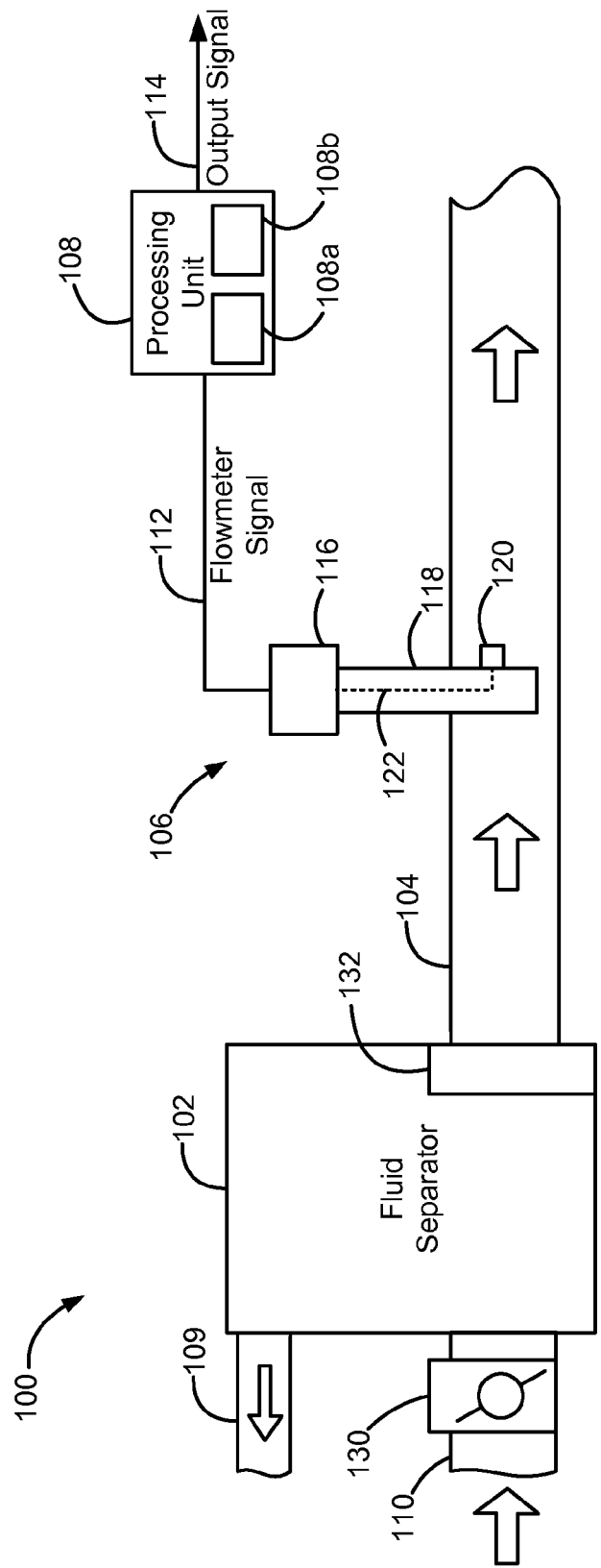
FIG. 1 is a schematic illustration of an implementation of a flowmeter system.

Referring to FIG. 1, a fluid separator system 100 is schematically illustrated. The fluid separator system 100 includes a fluid separator 102, an exhaust conduit 104, a flowmeter 106, and a processing unit 108. Although, in the example illustration of FIG. 1, the flowmeter 106 and the processing unit 108 are provided as separate components, implementations of the present disclosure include the flowmeter 106 and the processing unit 108 as a single, integrated component. The processing unit 108 can include one or more processors 108a and a computer-readable storage medium 108b coupled to the one or more processors 108a. The computer-readable storage medium 108b can have instructions stored thereon which, when executed by the one or more processors, cause the one or more processors to perform operations in accordance with implementations of the present disclosure. The computer-readable storage medium 108b can also store data collected from the flowmeter 106, such that the data can be accessed and processed (e.g., using the one or more processors 108a) to monitor the fluid separator system 100.

The fluid separator 102 receives a flow of a composite fluid from an inlet conduit 110. In some implementations, the flowmeter 106 is provided as a vortex-type flowmeter, discussed in further detail below. In some implementations, the flowmeter 106 is a turbine-type flowmeter or a orifice plate and differential pressure transmitter. The composite fluid includes a composition of different types of fluids, such as gas and liquid. The fluid separator 102 separates the composite fluid into individual flows of fluid for each type of fluid of the composite fluid. One of the separated fluids (e.g., liquid) is exhausted from the fluid separator 102 through the exhaust conduit 104. Remaining separated fluid(s) by the fluid separator 102 may be exhausted through other exhaust conduits. For example, a gas may be exhausted through an exhaust conduit 109.

The flowmeter 106 extends into the exhaust conduit 104, and is responsive to the fluid flowing therethrough. As the separated fluid exhausts from the fluid separator 102 and flows by the flowmeter 106, the flowmeter 106 generates a flowmeter signal 112 in response to the fluid flow. The flowmeter signal 112 is representative of a response of the flowmeter and is proportional to the flow rate of the fluid flow. The type of signal output by the flowmeter 106 is dependent upon the flowmeter 106 type. That is, different types of flowmeters 106 can output different signal. In some implementations, the signal can include a pulse signal measured in frequency (i.e., Hertz (Hz)). In some implementations, the signal can include a current signal (i.e., Amps (A), or milliamps (mA)) or via a digital protocol (e.g., HART, FieldBus, Modbus, Wireless, etc).

The flowmeter 106 outputs the flowmeter signal 112 to the processing unit 108. The processing unit 108 processes the flowmeter signal 112 and determines a flow rate of the fluid flowing through the exhaust conduit 104 based on the flowmeter signal 112. In some implementations, the processing unit 108 further determines a volume of fluid in exhaust conduit 104 over a given amount of time based on the flow rate of the fluid flow. In this manner, the processing unit 108 can totalize the volume of fluid that has been exhausted from the fluid separator 102. The processing unit 108 generates an output signal 114 representative of the calculated volume of the fluid exhausted from the fluid separator 102. In some implementations, the processing unit 108 can also output the flow rate of the fluid (e.g., to a display). In some implementations, the flowmeter signal 112 is representative of the flow rate and the volume of the fluid flow. Specifically, the flowmeter 106 may include a signal processing module that processes the data collected by the flowmeter 106 responsive to the fluid flow passing the flowmeter 106, and that determines the flow rate and the volume of the fluid flow through exhaust conduit 104.

The fluid separator system 100 can also include a valve 130 and a valve 132. The valve 130 is operable to regulate the flow of fluid into the fluid separator 102. The valve 130 can be manually operated or can be electro-mechanically operated based on a signal received from a controller. In a fully-closed position, the valve 130 prohibits fluid flow into the fluid separator 102. In a fully-open position, the valve 130 enables fluid flow into the fluid separator 102 at a maximum flow rate. In some implementations, the valve 130 can be actuated between the fully-closed position and the fully-open position to regulate the fluid flow rate between zero and the maximum flow rate.

The valve 132 is operable to regulate the flow of fluid from the fluid separator 102 and into the exhaust conduit 104. In some implementations, the valve 132 can be provided as a float-type valve. For example, when there is liquid within the fluid separator 102, the valve 132 may be in an open, or at least partially open position, enabling fluid flow from the fluid separator 102 into the exhaust conduit 104. As the liquid exhausts from the fluid separator 102, the valve 132 correspondingly moves toward a closed position. When the liquid has been completely, or at least sufficiently, exhausted from the fluid separator 102, the valve 132 is, or should be, closed, such that no other fluids (e.g., gas) are exhausted from into the exhaust conduit 104.

In some implementations, the fluid exhausted from the fluid separator 102 into the exhaust conduit 104 is a composite fluid including two different fluids (e.g. a gas and a liquid). When the fluid is a composite fluid, the processing unit 108 may determine the flow rate and the volume for each fluid and/or the processing unit 108 may determine the flow rate and the volume of the composite fluid. Further, the processing unit 108 may determine, based on the flowmeter signal 112, a time that each differing fluid type enters or exits the exhaust conduit 104.

By way of a non-limiting example, the fluid separator system 100 will be further discussed in the context of the flowmeter 106 including a vortex-type flowmeter. The vortex-type flowmeter 106 includes a signal processing module 116, a shedder 118, and a pressure sensor 120. The shedder 118 extends into the exhaust conduit 104 and functions as a vortex creating obstruction element. As fluid passes the flowmeter 106, and specifically the shedder 118, disturbances or vortices in the fluid flow are generated, which trail behind the shedder 118 with respect to the direction of the fluid flow of the fluid. The rate at which the vortices are created in the fluid flow behind the shedder 118 are proportional to the flow rate of the fluid flow. Example shedders are disclosed in U.S. Pat. Nos. 4,220,046 and 6,615,673, the disclosures of which are incorporated herein by reference in their entireties.

The vortices created behind the shedder 118 generate variations in pressure in the fluid flow. The pressure sensor 120 is responsive to the pressure variations and is able to detect such pressure variations. The pressure sensor 120 transmits a signal 122 to the signal processing module 116 based on the detected variations in pressure. In some implementations, the signal 122 is based on a quantity of variations in pressure detected. In response to the signal 122, the signal processing module 116 generates pulses and transmits the flowmeter signal 112 corresponding to the pulses to the processing unit 108. In some implementations, the pulses of the flowmeter signal 112 are of a different frequency rate than that of the signal 122.

The processing unit 108 processes the flowmeter signal 112 to determine the flow rate and/or the volume of fluid exhausted from the fluid separator 102. Specifically, respective frequencies of the generated pulses of the output signal 112 are proportional to the flow rate of the fluid flow. The processing unit 108 converts the frequency to fluid flow rate signals and determines the volume of fluid in exhaust conduit 104 based on the flow rate signals over a given period of time. The volume of fluid exhausted through the exhaust conduit 104 can be determined as a product of the flow rate of the fluid flow and the period of time. In some implementations, the flowmeter signal 112 includes the fluid flow rate signal. In this case, the flowmeter 106 converts the frequency estimates to fluid flow rate and provides the flow rate to the processing unit 108.

Figure 2:
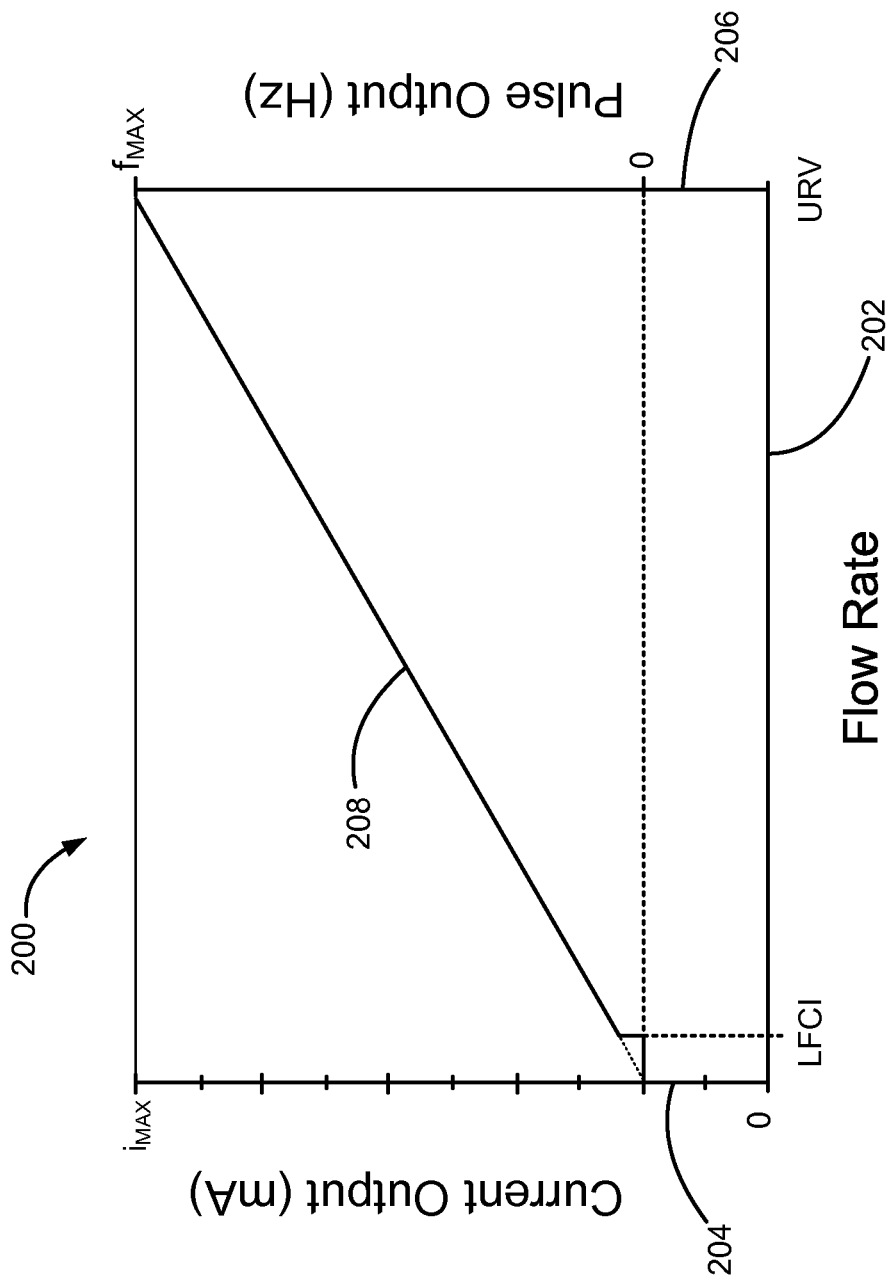
FIG. 2 is a graph illustrating a relationship between an output of a flowmeter and a flow rate of a fluid flow.

Referring to FIG. 2, a graph 200 illustrates a relationship between the output of the flowmeter 106 and the flow rate of the fluid flow. In the graph 200, the flow rate is provided along a horizontal axis 202. The flow rate can be provided in units of volume per time (e.g., gallons per minute (gpm)). As discussed above, the flowmeter 106 is responsive to the fluid flow through the exhaust conduit 104 and generates the flowmeter signal 112 based thereon. In some implementations, the flowmeter signal 112 can include a current signal (e.g., measured in milliamperes (mA)). In the graph 200, a current output (mA) is provided along a first vertical axis 204. The current output can range between a minimum current output (e.g., 4 mA) and a maximum current output ($i_{MAX}$) (e.g. 20 mA). In some implementations, the flowmeter signal 112 can include a pulse output (e.g., measured in hertz (Hz)). In the graph 200, the pulse output (Hz) is provided along a second vertical axis 206. The pulse output can range between a minimum pulse output (e.g., 0 Hz) and a maximum pulse output ($f_{MAX}$).

A curve 208 describes the relationship between the pulse output (or current output) of the flowmeter 106 and the flow rate of the fluid flow passing the flowmeter 106. Each point on the curve 208 representing the pulse output (or the current output) of the flowmeter signal 112 corresponds to a flow rate of the fluid flow. As the pulse output (or the current output) of the flowmeter signal 112 increases or decreases, a corresponding increase or decrease in the flow rate of the fluid flow is indicated. In the example implementation of FIG. 2, the curve 208 is substantially linear indicating a substantially linear relationship between the pulse output (or the current output) of the flowmeter signal 112 and the flow rate of the fluid flow. In some implementations, the curve 208 is any type of curve (e.g. geometric, parabolic, exponential, etc.). Consequently, the pulse output (or the current output) of the flowmeter signal 112 and the flow rate may have any type of pre-defined relationship.

The example curve 208 of FIG. 2 includes a low flow cut in (LFCI) that indicates a shift in the relationship between the pulse output (or the signal output) and the flow rate. The LFCI is a threshold of an operating range of the flowmeter 106 and is set by a user and/or manufacturer of the flowmeter 106 based on a density of the flow. The LFCI defines a forced-zero of the pulse output (or the current output). In short, a minimal fluid flow through the exhaust conduit 104 results in a corresponding minimal pulse output. Consequently, the pulse output is forced to zero (and the current output is forced to a minimum value), such that the flow rate is effectively deemed to be zero (e.g., 0 gpm). The curve 208 is bound at an upper limit by an upper range value (URV) of the fluid flow. The URV is established as the maximum expected flow rate of the fluid flow and/or a maximum signal output of the flowmeter 106.

Referring again to FIG. 1, the volume of fluid flowing through the exhaust conduit 104 is monitored. In some implementations, the fluid exhausted from the fluid separator 102 through the exhaust conduit 104 is expected to include liquid. However, in some instances, the fluid exhausted from the fluid separator 102 may include a composite fluid, such as a liquid and gas mixture. This can occur, for example, as a consequence of a gas surge. In such instances, the flowmeter 106 is responsive to both the liquid and the gas in the fluid flow, which may lead to difficulties in the processing unit 108 determining an accurate liquid volume total. Specifically, when the processing unit 108 determines the volume of the fluid flow in the exhaust conduit 104, the processing unit 108 may be unable to naturally differentiate between the volume of the gas and the volume of the liquid in the fluid flow. That is, during a gas surge, the volume of the liquid is misrepresented by the addition of the volume of the gas.

In accordance with the present disclosure, the fluid separator system 100 may compensate for the gas surge in the fluid flow such that an accurate liquid total of the fluid flow is obtained. Moreover, the gas surge exhausted from the fluid separator 102 may be indicative of a failure of the fluid separator system 100, e.g., a valve (not shown) being in an continued open position, a failure of the fluid separator 102, or the like. Consequently, and in accordance with the present disclosure, the fluid separator system 100 may generate an alarm in response to a prolonged gas surge, as described further below.

Figure 3:
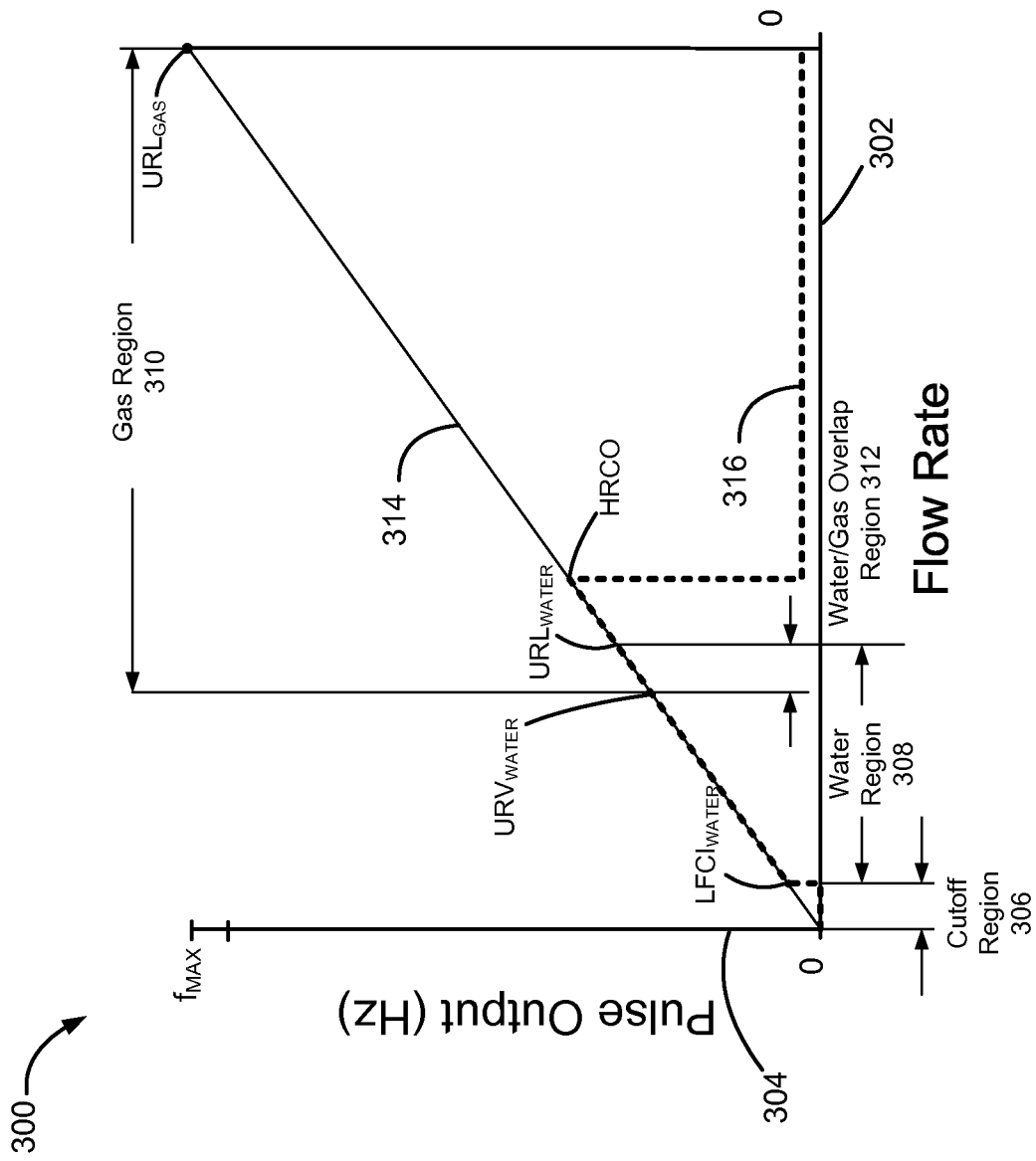
FIG. 3 is a graph illustrating an example implementation for adjusting an output of a flowmeter system in accordance with the present disclosure.

Referring to FIG. 3, a graph 300 illustrates an example modified relationship between the pulse output of the flowmeter signal 112 and the flow rate to account for a gas surge in the fluid flow. In the graph 300, the flow rate is provided along a horizontal axis 302. As discussed above, the flowmeter 106 is responsive to the fluid flow through the exhaust conduit 104 and generates the flowmeter signal 112 based thereon. The flowmeter signal 112 includes the pulse output (e.g., measured in hertz (Hz)). In the graph 300, the pulse output (Hz) is provided along a vertical axis 304. The pulse output can range between a minimum pulse output (e.g., 0 Hz) and a maximum pulse output ($f_{MAX}$). Although a pulse output is provided in the illustrated implementation, the principles of the present disclosure are applicable to a current output from the flowmeter 106 and other protocols.

The flow rate can be indicative of one of three regions including a cutoff region 306, a water region 308, and a gas region 310. The water region 308 and the gas region 310 overlap forming a water/gas overlap region 312. The cutoff region 306 is defined as the region where the flow rate of the fluid flow in the exhaust conduit 104 is between zero and the LFCI, as discussed above with respect to graph 200 of FIG. 2. The water region 308 is defined as the region where the fluid flow rate of the fluid in the exhaust conduit 104 is between the LFCI and a water upper range limit (URL). Flow rates in the water region 308 are indicative of the expected range of flow rates for a liquid (e.g., water). The water URL is a maximum allowed flow rate of the fluid flow for the exhaust conduit 104. In some implementations, the fluid flow for the exhaust conduit is based on one or more factors including, for example, a density of the fluid (e.g. water). The gas region 310 is indicative of the expected range of flow rates of gas. The gas URL is similar to that of the water URL. The water URV is set by the user and/or manufacturer of the flowmeter system 100 corresponding to a desired pulse output and flow rate of the fluid flow in the exhaust conduit 104.

An example curve 314 defines the relationship between the pulse output of the flowmeter signal 112 and the flow rate of the fluid flow within the exhaust conduit 104. The curve 314 includes a plurality of thresholds. The first threshold is provided as the LFCI, as discussed above with reference to the graph 200 and FIG. 2. For a pulse output of the flowmeter signal 112 less than the LFCI, the processing unit 108 sets the flow rate of the output signal 114 to a cut-in value (e.g., zero). The second threshold is a high rate cut off (HRCO). The HRCO indicates a gas surge condition. More specifically, when the pulse output is at or above the HRCO, the fluid flow is deemed to be only gas. In some implementations, the HRCO can be determined to be a pre-defined percentage of the water URV. In an example implementation, the HRCO is 110% of the water URV. In some implementations, the HRCO can be set by a user of the fluid separator system 100. Specifically, user input is received by the processing unit 108 and the processing unit 108 sets the HRCO based on the user input.

In the event of a gas surge, the volume of the gas surge is compensated for by the fluid separator system 100. Specifically, for a pulse output greater than the HRCO, the processing unit 108 reduces the pulse output to a heartbeat pulse 316. The heartbeat pulse 316 is used to determine the flowrate of the fluid flow. In some implementations, the heartbeat pulse 316 is provided as a low frequency pulse that is a percentage lower than the LFCI. In an example implementation, the heartbeat pulse 316 is set to be 50% of the LFCI. In some implementations, the heartbeat pulse 316 is set by the user of the fluid separator system 100. Specifically, user input is received by the processing unit 108 and the processing unit 108 sets the heartbeat pulse based on the user input. The flow rate corresponding to the frequency associated with the heartbeat pulse 316 is substantially less than the flow rate that would be otherwise calculated based on the unmodified pulse output of the flowmeter signal 112.

The flow rate determined based on the heartbeat pulse 316 can be used to totalize a volume of gas flow through the exhaust conduit 104 and/or the volume of the liquid flow through the exhaust conduit 104. By employing the flow rate corresponding to the frequency associated with the heartbeat pulse 316, the processing unit 108 substantially does not include the volume of the gas surge that is present within the fluid flow of the exhaust conduit 104 giving a more precise liquid total for the fluid flow. Specifically, when totalizing the volume of liquid within the exhaust conduit 104, the volume of the gas surge corresponding to the flow rate represented by the heartbeat signal 316 that is added to the volume of the liquid is minimized. For a pulse output of the curve 314 between the LFCI and the HRCO, the processing unit 108 uses unmodified output signal 114 to correspond to the pulse output of the flowmeter signal 112.

Figure 4:
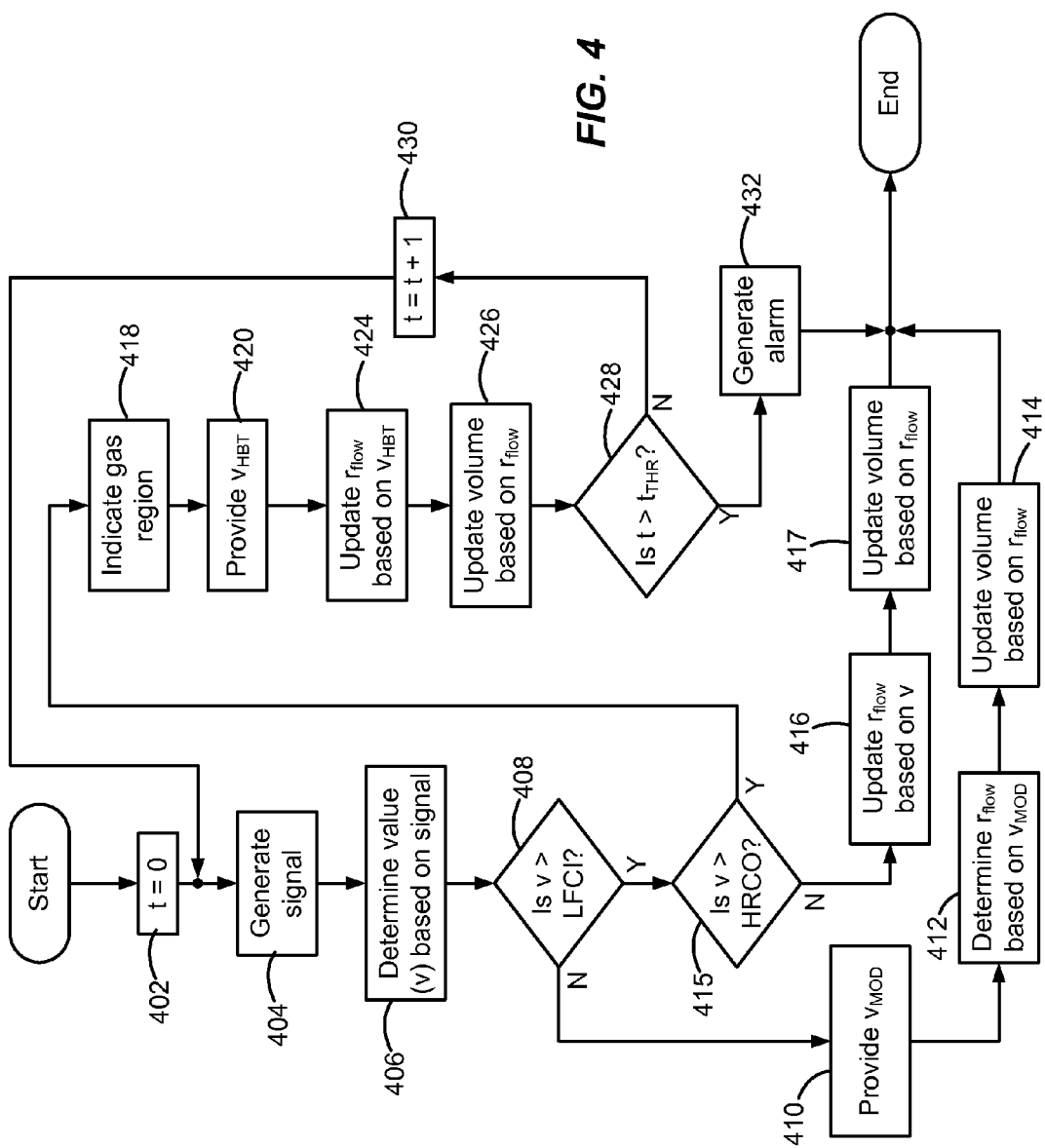
FIG. 4 is a flowchart illustrating an example process for monitoring a flow rate of a fluid flow through a conduit in accordance with the present disclosure.

Referring to FIG. 4, a flowchart illustrates an example process 400 for monitoring a fluid flow through the exhaust conduit 104. The process 400 can be executed using components of the fluid separator system 100 of FIG. 1, for example. A timer (t) is initialized to zero (402). For example, the processing unit 108 can initialize the time to zero. The timer can indicate a time the fluid flow through the exhaust conduit 104 is within the gas region (e.g., the gas region 310 of FIG. 3). The flowmeter signal 112 is generated (404). For example, the flowmeter 106 generates the flowmeter signal 112 responsive to the fluid flow. As discussed above, the flowmeter signal 112 can include a frequency output, a current output, or digital protocols. A value (v) is determined based on the flowmeter signal (406). In some implementations, the value (v) corresponds to a frequency output of the flowmeter signal 112. In some implementations, the value (v) corresponds to a current output of the flowmeter signal 112.

The value (v) is compared to the LFCI (408). When the value (v) is less than the LFCI, the value is modified to provide a modified value ($v_{MOD}$) (410). For example, the processing unit 108 can modify the value (v) to provide the modified value ($v_{MOD}$). The flow rate is determined based on the modified value ($v_{MOD}$) (412). For example, the processing unit 108 determines the flow rate ($r_{flow}$) based on the modified value ($v_{MOD}$). The volume of fluid flowing past the flowmeter is updated based on the flow rate ($r_{flow}$) (414), and the process ends.

When the value (v) is greater than the LFCI (408), the value (v) is compared to the HRCO (415). When the value (v) is not greater than the HRCO, the flow rate ($r_{flow}$) is determined based on the value (v) (416). The volume of the fluid flow is updated based on the flow rate ($r_{flow}$) (417), and the process ends. When the value (v) is greater than the HRCO, the fluid flowing past the flowmeter is indicated as being in the gas region (418).

The value (v) is modified to a heartbeat value ($v_{HBT}$) (420). The flow rate ($r_{flow}$) is determined based on the heartbeat value ($v_{HBT}$) (424). The volume of the fluid flow is updated based on the flow rate ($r_{flow}$) (426). The timer (t) is compared with a time threshold ($t_{THR}$) (428). When the timer (t) is less than the time threshold ($t_{THR}$), the timer (t) is incremented (430), and the process continues (404). When the timer (t) is greater than the time threshold ($t_{THR}$), an alarm signal is generated (432), and the process ends. The time threshold is user definable dependent upon the application desired.

The alarm signal indicates that the fluid flow is in the gas region for an extended amount of time. The alarm signal notifies a user of the flowmeter separator system 100 of this condition such that corrective actions may be taken, if desired. The alarm signal can indicate a failure within the fluid separator system 100. For example, the alarm signal can indicate that a valve, such as the valve 132 of FIG. 1, is stuck in an open position. In this manner, an operator is alerted that the valve 132 is stuck in an open position and that corrective action should be taken. Example corrective action can include regulating the valve 130 to the closed position to inhibit fluid flow into the fluid separator 102, and/or fixing or replacing the valve 132.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A method, comprising:
    receiving a signal from a flowmeter, the flowmeter being responsive to a fluid flow through the conduit;
    determining a value based on the signal;
    comparing the value to a threshold;
    providing a heartbeat value when the value is greater than the threshold; and
    determining a flow rate of the fluid flow based on the heartbeat value;
    wherein the threshold is indicative of a boundary between a liquid region and a gas region of the fluid flow.

2. The method of claim 1, wherein the flowmeter comprises a vortex flowmeter.

3. The method of claim 1, further comprising determining a volume of fluid flowing through the conduit based on the flow rate.

4. The method of claim 1, wherein the fluid flow is a composite fluid flow comprising a first fluid and a second fluid.

5. The method of claim 4, wherein the first fluid is a liquid and the second fluid is a gas.

6. The method of claim 1, wherein the threshold is determined as a percentage of an upper range value corresponding to an expected type of fluid flow.

7. The method of claim 6, wherein the expected type of fluid flow is liquid.

8. The method of claim 1, further comprising:
    receiving user input; and
    determining the threshold based on the user input.

9. The method of claim 1, further comprising totalizing a volume of the flow over a period of time to determine a total volume of fluid.

10. The method of claim 9, wherein totalizing further comprises minimizing the volume of the flow within the total volume flow when the flow rate is based on the heartbeat value.

11. A system, comprising:
    a flowmeter;
    one or more processors in communication with the flowmeter; and
    a computer-readable storage medium coupled to the one or more processors having instructions stored thereon which, when executed by the one or more processors, cause the one or more processors to perform operations, comprising:
        receiving a signal from a flowmeter, the flowmeter being responsive to a fluid flow through the conduit;
        determining a value based on the signal;
        comparing the value to a threshold;
        providing a heartbeat value when the value is greater than the threshold; and
        determining a flow rate of the fluid flow based on the heartbeat value;
    wherein the threshold is indicative of a boundary between a liquid region and a gas region of the fluid flow.

12. The system of claim 11, wherein the flowmeter comprises a vortex flowmeter.

13. The system of claim 11, wherein the operations further comprise determining a volume of fluid flowing through the conduit based on the flow rate.

14. The system of claim 11, wherein the fluid flow is a composite fluid flow comprising a first fluid and a second fluid.

15. The system of claim 14, wherein the first fluid is a liquid and the second fluid is a gas.

16. The system of claim 11, wherein the threshold is determined as a percentage of an upper range value corresponding to an expected type of fluid flow.

17. The system of claim 16, wherein the expected type of fluid flow is liquid.

18. The system of claim 11, wherein the operations further comprise:
    receiving user input; and
    determining the threshold based on the user input.

19. The system of claim 11, wherein the operations further comprise totalizing a volume of the flow over a period of time to determine a total volume of fluid.

20. The system of claim 19, wherein totalizing further comprises minimizing the volume of the flow within the total volume flow when the flow rate is based on the heartbeat value.

21. A method, comprising:
    receiving a signal from a flowmeter, the flowmeter being responsive to a fluid flow;
    determining a value based on the signal;
    comparing the value to a threshold;
    providing a heartbeat value when the value is greater than the threshold;
    monitoring the heartbeat value; and
    selectively generating an alarm based on the monitoring;
    wherein the threshold is indicative of a boundary between a liquid region and a gas region of the fluid flow.

22. The method of claim 21, wherein monitoring the heartbeat value comprises:
    determining an amount of time the value is greater than the threshold; and
    comparing the amount of time to a time threshold, wherein the alarm is generated when the amount of time is greater than the time threshold.

23. The method of claim 21, wherein the flowmeter comprises a vortex flowmeter.

24. The method of claim 21, wherein the fluid flow is a composite fluid flow comprising a first fluid and a second fluid.

25. The method of claim 24, wherein the first fluid is a liquid and the second fluid is a gas.

26. The method of claim 21, wherein the threshold is determined as a percentage of an upper range value corresponding to an expected type of fluid flow.

27. The method of claim 26, wherein the expected type of fluid flow is liquid.

28. The method of claim 21, further comprising:
    receiving user input; and
    determining the threshold based on the user input.

29. A system, comprising:
    a flowmeter;
    one or more processors in communication with the flowmeter; and
    a computer-readable storage medium coupled to the one or more processors having instructions stored thereon which, when executed by the one or more processors, cause the one or more processors to perform operations, comprising:
        receiving a signal from a flowmeter, the flowmeter being responsive to a fluid flow;
        determining a value based on the signal;
        comparing the value to a threshold;
        providing a heartbeat value when the value is greater than the threshold;
        monitoring the heartbeat value; and
        selectively generating an alarm based on the monitoring wherein the threshold is indicative of a boundary between a liquid region and a gas region of the fluid flow.

30. The system of claim 29, wherein monitoring the heartbeat value comprises:
   determining an amount of time the value is greater than the threshold; and
   comparing the amount of time to a time threshold, wherein the alarm is generated when the amount of time is greater than the time threshold.

31. The system of claim 29, wherein the flowmeter comprises a vortex flowmeter.

32. The system of claim 29, wherein the fluid flow is a composite fluid flow comprising a first fluid and a second fluid.

33. The system of claim 32, wherein the first fluid is a liquid and the second fluid is a gas.

34. The system of claim 29, wherein the threshold is determined as a percentage of an upper range value corresponding to an expected type of fluid flow.

35. The system of claim 34, wherein the expected type of fluid flow is liquid.

36. The system of claim 29, wherein the operations further comprise:
   receiving user input; and
   determining the threshold based on the user input.

* * * * *